No. 622,052. Patented Mar. 28, 1899.
T. LINKE.
FILTER.
(Application filed Jan. 22, 1898.)
(No Model.)
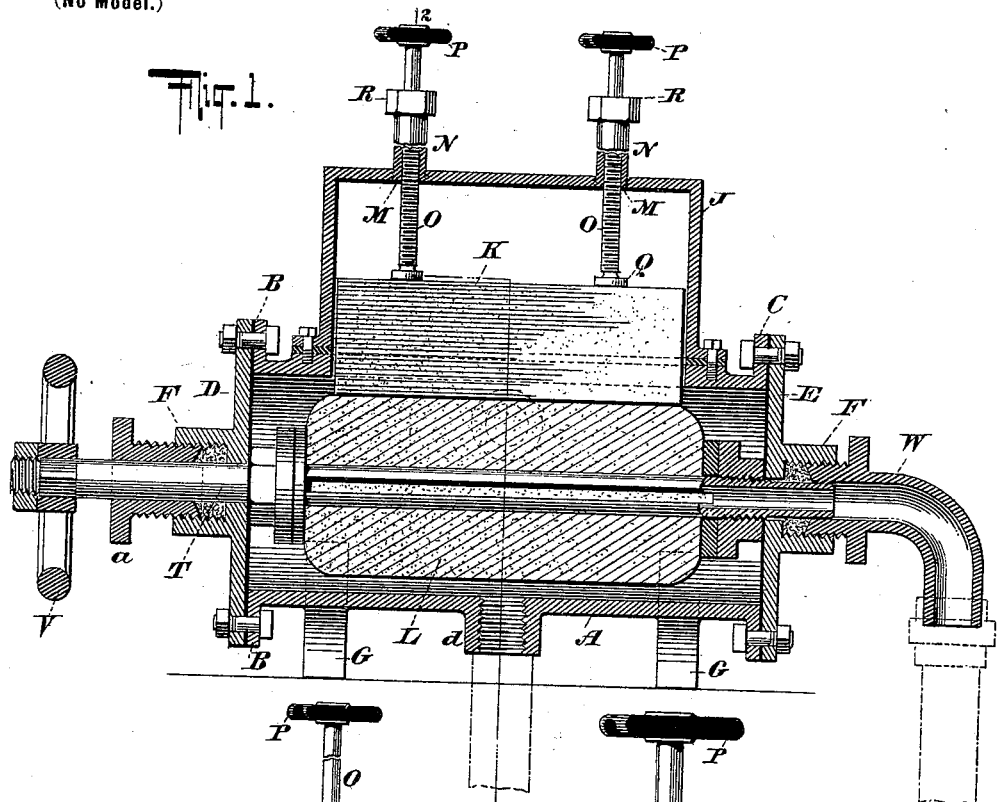
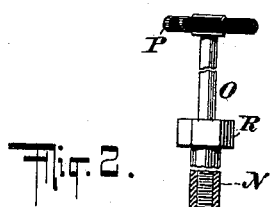
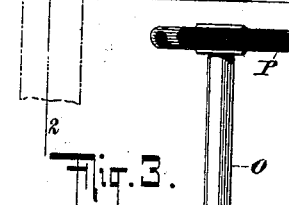
WITNESSES:
Gustave Dieterich
John Kehlenbeck.
INVENTOR
Theodore Linke,
BY
Chas. C. Gill
ATTORNEY.

United States Patent Office.

THEODORE LINKE, OF NEW YORK, N. Y.

FILTER.

SPECIFICATION forming part of Letters Patent No. 622,052, dated March 28, 1899.

Application filed January 22, 1898. Serial No. 667,551. (No model.)

*To all whom it may concern:*

Be it known that I, THEODORE LINKE, a citizen of the United States, and a resident of New York, in the county of New York and State of New York, have invented certain new and useful Improvements in Filters, of which the following is a specification.

The invention relates to improvements in filters; and it consists in the novel features of construction and combinations of parts hereinafter described and particularly pointed out in the claims.

In the accompanying drawings I have illustrated my invention in a filter comprising a main cylindrical casing having an inlet for unfiltered water, an outlet for filtered water, and an outlet for unfiltered water and provided with a revoluble porous stone by which the water is filtered and an additional stone engaging at one edge the surface of the revoluble porous stone, whereby the latter during its revoluble motion is cleansed. The revoluble porous stone for effecting the fitering of the water is mounted upon a revoluble tube which extends longitudinally through the casing of the filter and at one end, which is open, is in communication with the outlet for filtered water, while its other end, which is closed, is provided with a hand-wheel by which the tube and the stone carried thereby may be revolved at will for the purpose of having the same cleansed.

The invention will be fully understood from the detailed description hereinafter presented, reference being had to the accompanying drawings, in which—

Figure 1 is a central vertical longitudinal section through a filter constructed in accordance with and embodying the invention. Fig. 2 is a central vertical transverse section of the same on the dotted line 2 2 of Fig. 1, and Fig. 3 is a like section of a portion of same on an enlarged scale.

In the drawings, A designates a cylindrical casing having at its ends the flanges B C, to which are secured, by means of bolts, the heads D E, each of the latter having the central aperture surrounded by the annular flange F. The casing A is adapted to be supported upon the legs G and at its upper side is formed with the longitudinal slot H and shoulders I, upon which shoulders I is secured by screws the elongated casing J, which extends upward a suitable distance and contains the stone K, which is used for effecting the cleansing of the filtering-stone L. The casing J is closed except at its bottom and at its bottom opens directly into the slot H, formed in the casing A. The top of the casing J contains the threaded apertures M, into which are screwed the internally-threaded sleeves N, which contain the lower threaded portions of the stems O, having the handles P on their upper end and at their lower end carrying the disks Q, the latter bearing directly upon the upper edge of the stone K and being fastened loosely to the stems O by means of screws, so that as the stems are revolved the disks Q will not lose their connection with the stems, but will not revolve. Upon the upper ends of the sleeves N are screwed the caps R, inclosing the packing S, the purpose of the latter being to prevent leakage around said stems O.

The casing A contains the porous stone L, above referred to, the latter being in the form of a cylinder having a central aperture receiving the tube T, upon which said stone is mounted and which is revoluble, so as to carry the surfaces of said stone L against the lower edges of the cleansing-stone K. The tube T at one end is solid and carries the hand-wheel V, by which said tube and the stone L may be turned at will, while the other end of said tube T is open and enters the inner end of the discharge-nozzle W for filtered water, as indicated at the right-hand side of Fig. 1. The ends of the tube T pass through the flanges F, above referred to, and the left-hand end of said tube T is packed by means of the stuffing-box or gland shown, the flange F containing the packing and being internally threaded to receive the nut $a$, which encompasses the left-hand end of said tube T. The right-hand end of the tube T is packed by the screwing into the right-hand flange F of the inner threaded end of the nozzle W, said end of said nozzle forming, in effect, a nut, which is screwed inward against the packing inclosed within said right-hand flange F. The stuffing-box at each end of the tube T prevents leakage through the ends of the casing A. Within the porous stone L the tube T is slotted, as shown in Figs. 1 and 2, in order that the water passing through the stone may enter the tube T through the slots therein and thus find an exit-passage to the discharge-nozzle W for filtered water. The discharge-nozzle W forms an exit for filtered water exclusively, and it may be connected with a pipe, as indicated by dotted lines, or it may be left free, so that the water issuing therefrom may be caught in any receptacle placed to receive it. The right-hand end of the tube T enters the inner end of the nozzle W, as shown in Fig. 1, but does not tightly fit said nozzle, and hence when the tube T is turned its right-hand end will turn freely within the inner end of the nozzle W without disturbing the latter. The nozzle W or the pipe connected therewith may, if desired, be provided with a valve in order to cut off the exit of the water through the nozzle whenever desired. The inlet for unfiltered water to the casing A is shown at $b$ in Fig. 2, said inlet being in the form of an internally-threaded nozzle to receive the supply-pipe, (indicated by dotted lines.) At its lower side the casing A is provided with an outlet-nozzle $d$ to receive the discharge-pipe (indicated by dotted lines) and through which the unfiltered water may pass. The pipe connected with the discharge-nozzle $d$ should be provided with a usual valve in order that said pipe may be closed when it is desired to receive filtered water from the apparatus.

In the operation of the filter the water will pass through the nozzle $b$ to the chamber within the casing A and will surround the cylinder of porous stone L, through which the water will pass to the tube T and thence escape in a filtered condition through the nozzle W. The cleansing-stone K rests upon the cylinder of porous stone L, and when the surface of the latter becomes foul the said stone L by means of the hand-wheel V will be given a revolving motion in order that its surfaces may be rubbed against the lower edges of the stone K and be thereby cleansed. During the cleansing of the stone L the delivery-pipe for filtered water will be closed, as usual, and the discharge-pipe for unfiltered water connected with the nozzle $d$ will be open, and thus the impurities removed from the porous stone L may find a ready escape through the discharge-pipe for unfiltered water. Should the stone K not exert sufficient pressure upon the porous stone L, it may be forced upon said stone L by means of the threaded stems O, which when turned in one direction will cause the disks Q to press firmly upon the upper edges of said stone K. The stone K may also be forced downward by the spindles O in order to insure at all times the proper relation of the stone K with the cylindrical stone L as the latter is worn down. The weight of the stone K has a natural tendency to keep the lower edges of said stone against the surface of the cylindrical porous stone L, and hence the spindles O and disks Q are employed simply to insure at all times and under all conditions the successful cleansing of the porous stone L by means of said stone K.

What I claim as my invention, and desire to secure by Letters Patent, is—

1. The filter comprising the casing A having the inlet-nozzle $b$ and outlet-nozzle $d$ and provided with the end flanges B, C, the heads D, E, secured to said flanges and having the annular flanges F, and the threaded nozzle W screwed into one of said flanges F and against the packing therein, combined with the cylindrical porous stone within said casing A, the slotted tube upon which said porous stone is mounted and which extends through said heads D, E, the hand-wheel upon one end of said tube, and the nut $a$ applied to the flange F nearest to said hand-wheel, the open end of said tube being extended into the inner end of said nozzle W; substantially as shown and set forth.

2. The filter comprising the casing A having the inlet for water and the outlet for unfiltered water, the cylindrical porous stone in said filter and the slotted tube upon which porous stone is mounted and which connects with the discharge for filtered water, combined with the hand-wheel on said tube by which the latter and said stone may be revolved, the cleansing-stone K having one of its edges in contact with the surface of said porous stone, the casing J for said stone K, the threaded sleeve N upon said casing J and having the cap R, and the threaded spindle within said sleeve N and having the handle at its upper end and at its lower end bearing upon said stone K; substantially as set forth.

Signed at New York, in the county and State of New York, this 20th day of January, 1898.

THEODORE LINKE.

Witnesses:
E. JOS. BELKNAP,
CHAS. C. GILL.